Aug. 14, 1962

D. A. DAVIS ET AL 3,048,943

APPARATUS FOR PRODUCING ALL-GLASS MULTIPLE SHEET GLAZING UNITS

Filed April 6, 1959

INVENTORS
Donald A. Davis and
BY Charles H. Cowley
Nobbe & Swope
ATTORNEYS

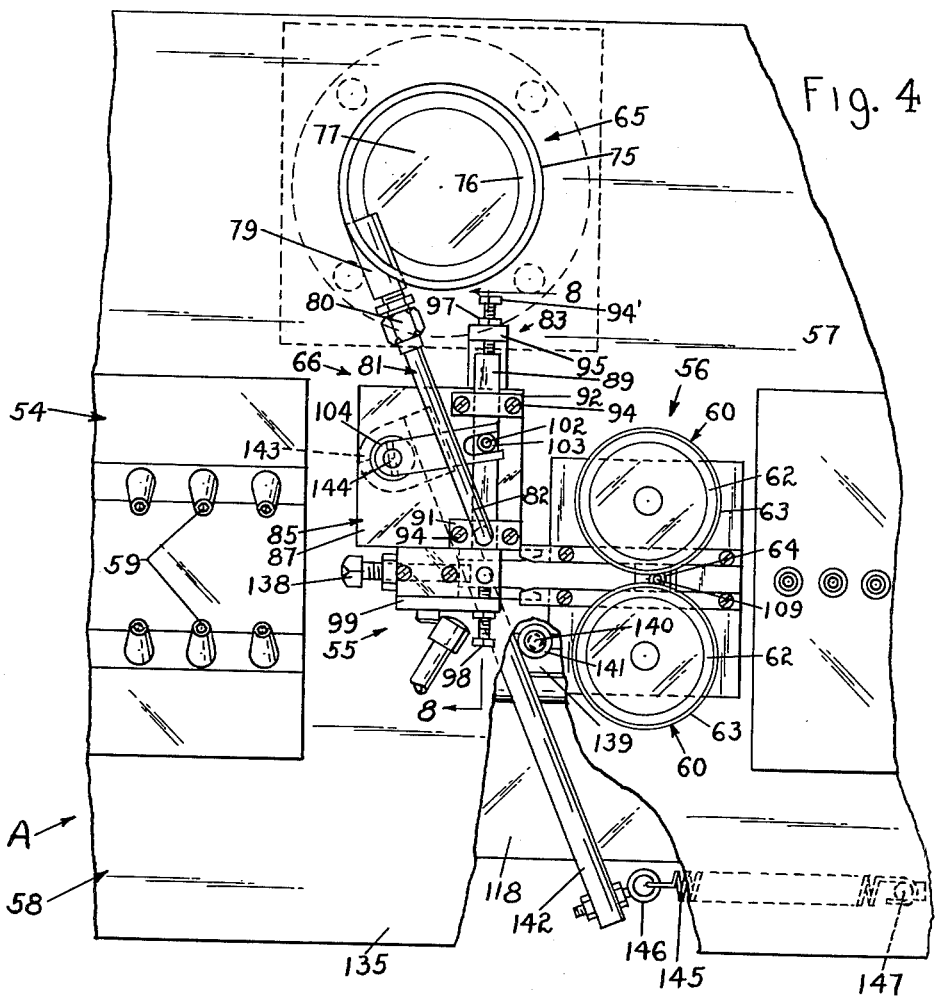

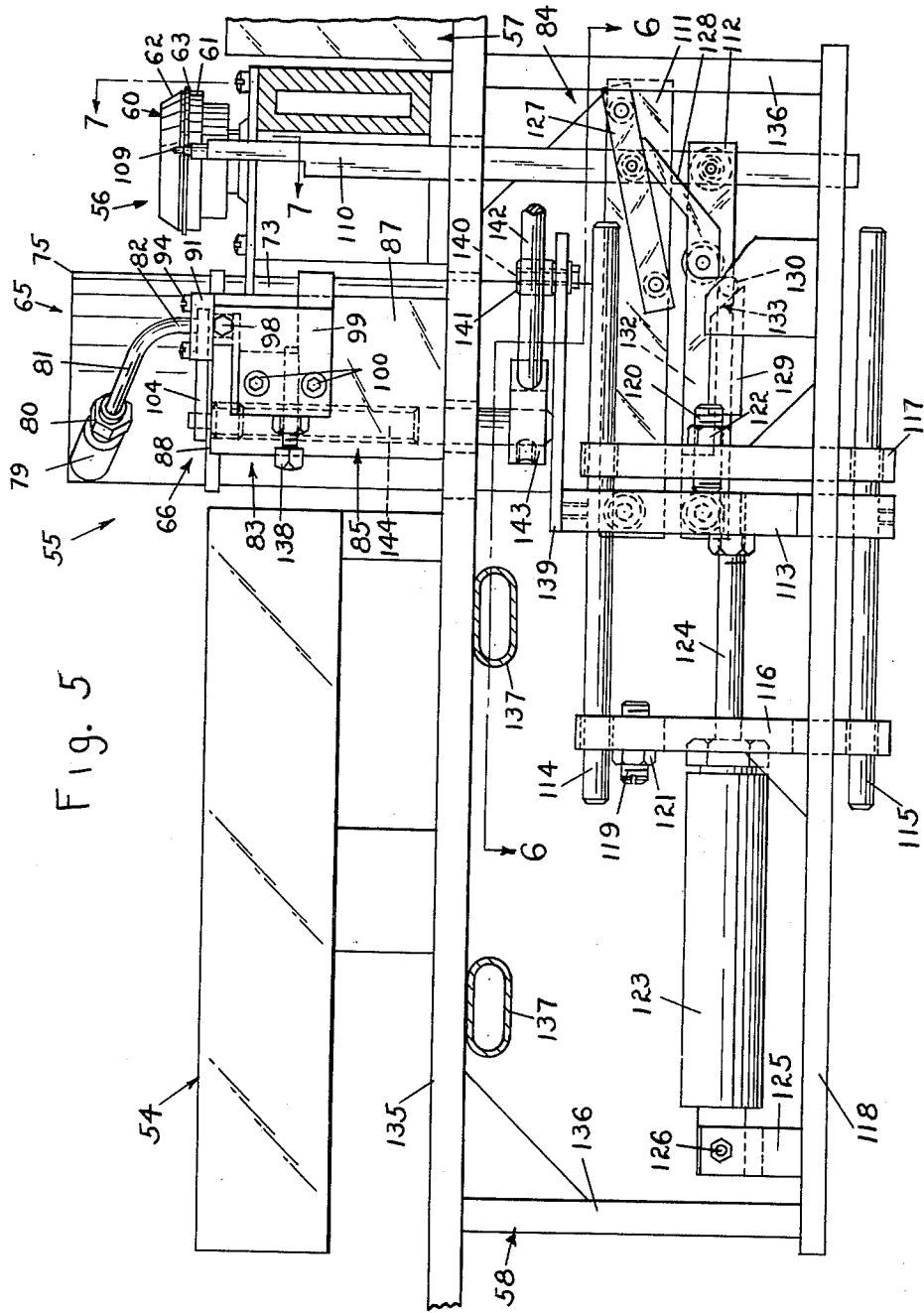

Aug. 14, 1962

D. A. DAVIS ET AL 3,048,943

APPARATUS FOR PRODUCING ALL-GLASS MULTIPLE
SHEET GLAZING UNITS

Filed April 6, 1959

INVENTORS
Donald A. Davis and
BY Charles H. Cowley
Nobbe & Swope
ATTORNEYS

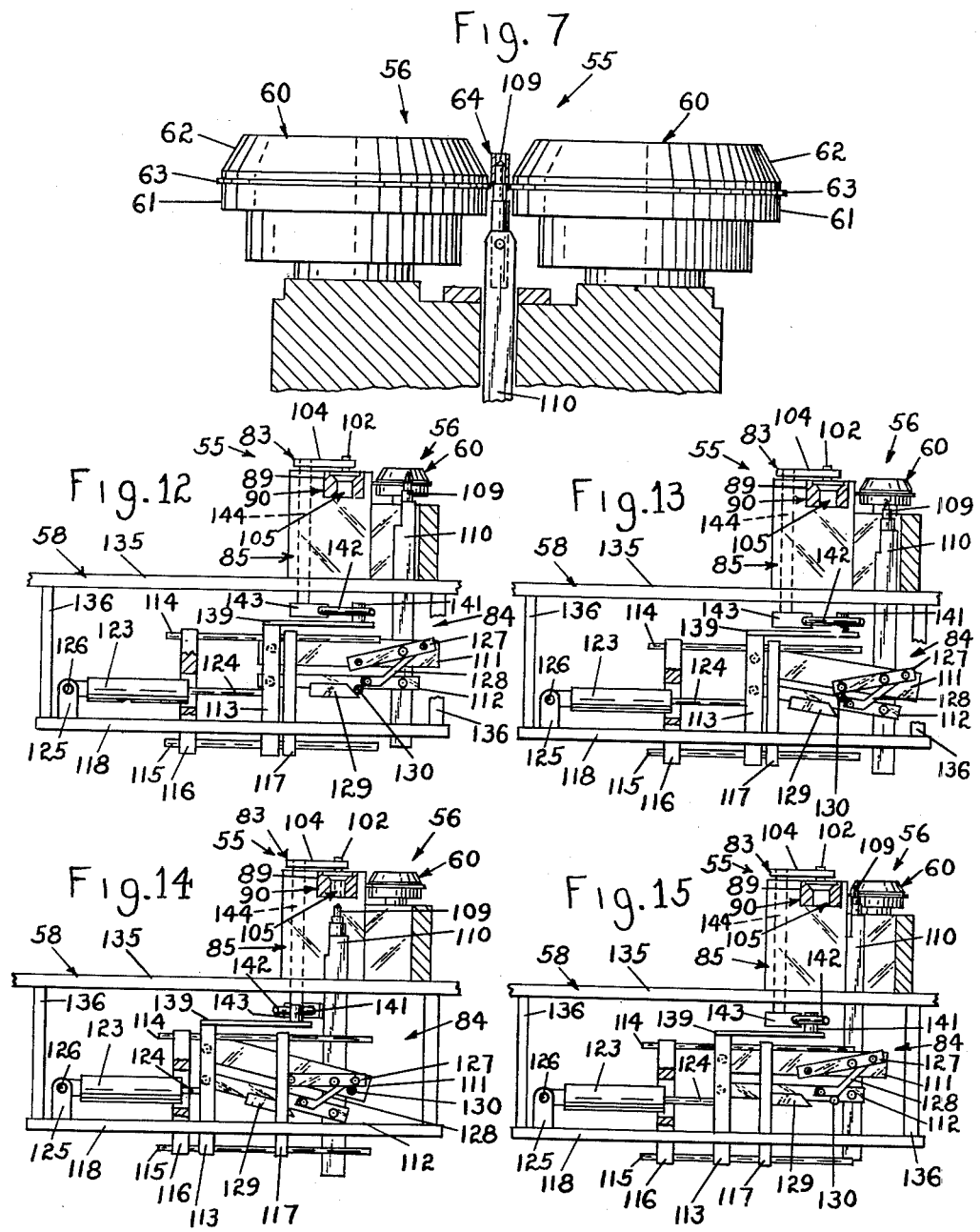

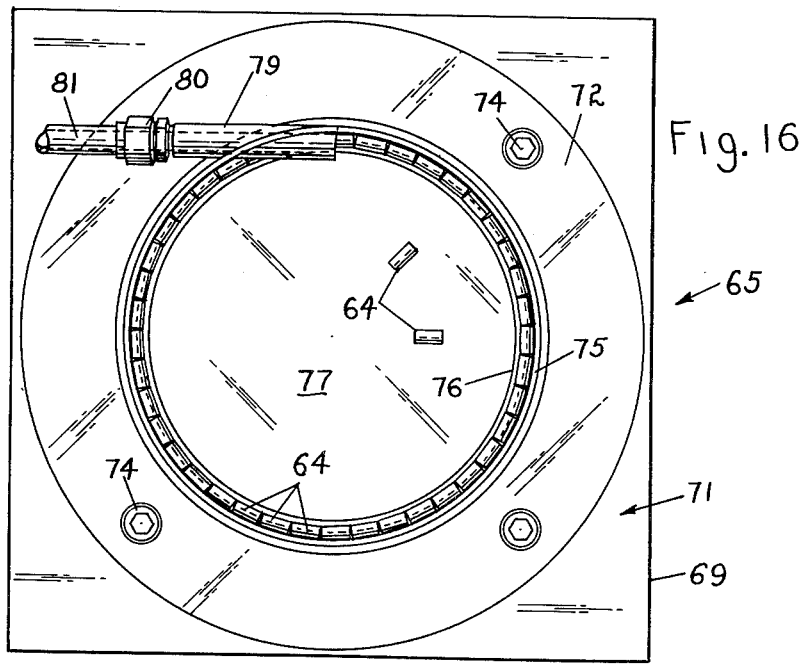
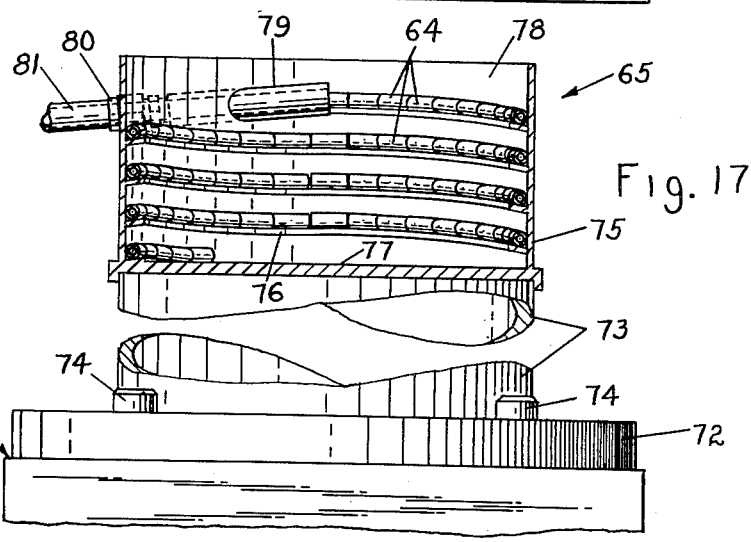
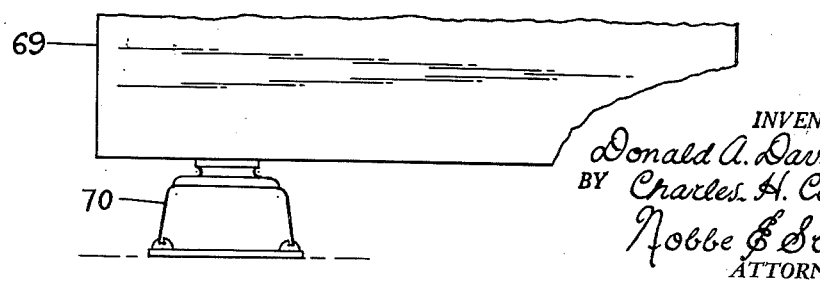

United States Patent Office 3,048,943
Patented Aug. 14, 1962

3,048,943
APPARATUS FOR PRODUCING ALL-GLASS
MULTIPLE SHEET GLAZING UNITS
Donald A. Davis and Charles H. Cowley, Toledo, Ohio, assignors to Libbey-Owens-Ford Glass Company, Toledo, Ohio, a corporation of Ohio
Filed Apr. 6, 1959, Ser. No. 804,355
3 Claims. (Cl. 49—1)

The present invention relates broadly to the manufacture of all-glass multiple sheet glazing units and more particularly to improved apparatus for providing a dehydration or breather hole in such a unit.

Multiple sheet glazing units generally comprise two or more sheets of glass sealed together entirely around their edge portions in spaced relation to provide one or more hermetically sealed air spaces therebetween. Mainly because of their insulating and condensation preventing qualities such units are finding wide acceptance for use in buildings, showcases, vehicles, refrigerators and the like.

To provide a multiple sheet glazing unit of the above character having good heat insulating and condensation preventing qualities an essential step in the fabrication thereof is the removal of air having a high humidity, or even air of normal moisture content, from the space enclosed between the glass sheets. This step may be performed in several general ways, for example, by partial evacuation of the unit or by replacing the humid air with dry air or gas, whichever is better suited to the conditions to which the unit is to be subjected after its installation. In order to enable the removal of the moist air from the space enclosed by the glass sheets, a means of access to this enclosed space must be provided in the unit. Further, after the enclosed space has been dehydrated this means of access, or dehydration hole, must be permanently sealed to hermetically close the unit to prevent any contamination of the space through the introduction of moisture, dust or dirt therein.

Conventionally, the provision of access or dehydration holes to the enclosed space between the glass sheets in multiple sheet glazing units of this type has been by drilling or otherwise cutting one or more openings through the face portions of the sheets before their assembly into a final unit. However, drilling or cutting holes in glass is accompanied by several disadvantages in that the glass sheets oftentimes are broken during the drilling or cutting operation, or small fissures develop around the hole during its formation which, at a later time, cause the sheet to break on being exposed to thermal or physical shocks. In addition, when the holes are located in the face portions of the glass sheets the material which is used to seal the hole is exposed after the unit has been installed leaving it vulnerable to sharp instruments such as a glazier's putty knife.

More recently, a method has been developed for producing a dehydration or access opening in the sealed edge wall of an all-glass multiple glazing unit during its manufacture by the incorporation of a hollow metal insert or grommet into the edge wall as the glass sheets are fused to one another. This concept is disclosed in the copending application of Alfred E. Badger et al., Serial No. 737,419, now Patent No. 2,941,651, and it is with regard to this concept that the present invention is particularly concerned.

A primary object of this invention therefore is to provide an improved apparatus for incorporating the hollow metal insert in the dehydration or breather opening in the sealed edge wall of all-glass multiple sheet glazing units during the fabrication of the units.

Another object of the invention is to provide improved apparatus for forming dehydration or breather holes in the sealed edge portions of all-glass multiple sheet glazing units by locating the hollow metallic insert in an edge wall of the unit during production thereof and sealing the insert into the edge wall simultaneously with the sealing of the sheet edges to one another.

A further object of the invention is to provide improved apparatus of the above character including means for supporting and carrying the glass sheets to be sealed together past a sealing means and for controlling the insertion of the hollow insert into position between the marginal edge portions of the glass sheets as said sheets move past said sealing means.

Other objects and advantages of the invention will become more apparent during the course of the following description when taken in connection with the accompanying drawings.

In the drawings wherein like numerals are employed to designate like parts throughout the same:

FIG. 4 is a fragmentary partially in section plan view of a forming tool and hole forming means according to the invention;

FIG. 5 is a fragmentary sectional elevational view of the forming tool and hole forming means of FIG. 4;

FIG. 7 is a sectional end elevational view of the forming tool taken along 7—7 of FIG. 5;

FIG. 9 is a sectional end view of the marginal edges of a pair of sheets of glass;

FIG. 10 is a sectional end view of a sealed edge wall of an all-glass glazing unit of the character described herein;

FIG. 11 is a sectional view of an all-glass glazing unit showing a dehydration opening made in accordance with the invention;

FIG. 12 is a diagrammatic view of the apparatus of the invention showing an insert just prior to being fused into an edge wall;

FIG. 13 is a diagrammatic view showing the novel insertion apparatus being withdrawn after an insertion operation;

FIG. 14 is a diagrammatic view illustrating the insertion apparatus in position to be provided with a metallic insert;

FIG. 15 is a diagrammatic view illustrating moving an insert forward into position between forming rolls and glass sheets;

FIG. 16 is a plan view of a novel metal insert storage and supply means; and

FIG. 17 is a fragmentary partially in section elevational view of the supply and storage means of FIG. 16.

Figure 1:
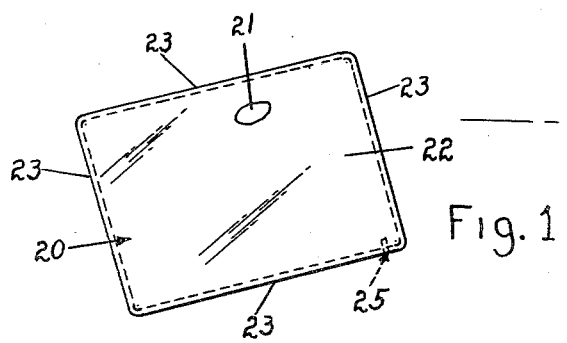
FIG. 1 is a perspective view of an all-glass multiple sheet glazing unit provided with a dehydration hole by the apparatus of the invention.

Referring now to the drawings there is shown in FIG. 1 and in cross-section in FIGS. 9 through 11 an all-glass glazing unit 20 produced by the apparatus of the present invention which comprises a pair of sheets of glass 21 and 22 maintained in a fixed spaced relation with respect to one another by a fused edge wall 23 enclosing a space 24 between the sheets. A dehydration or breather hole with which the present invention is particularly concerned is provided in at least one of the edge wall portions 23 as shown at 25.

Figure 2:
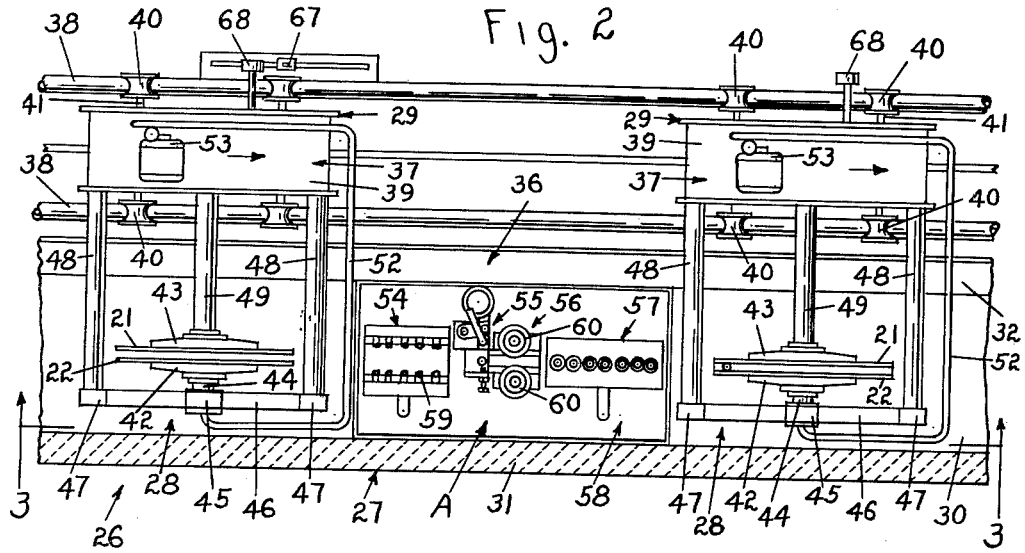
FIG. 2 is a plan view of the apparatus for producing glazing units showing a glass sheet conveyor in relation to fusing burners and hole forming means.
Figure 3:
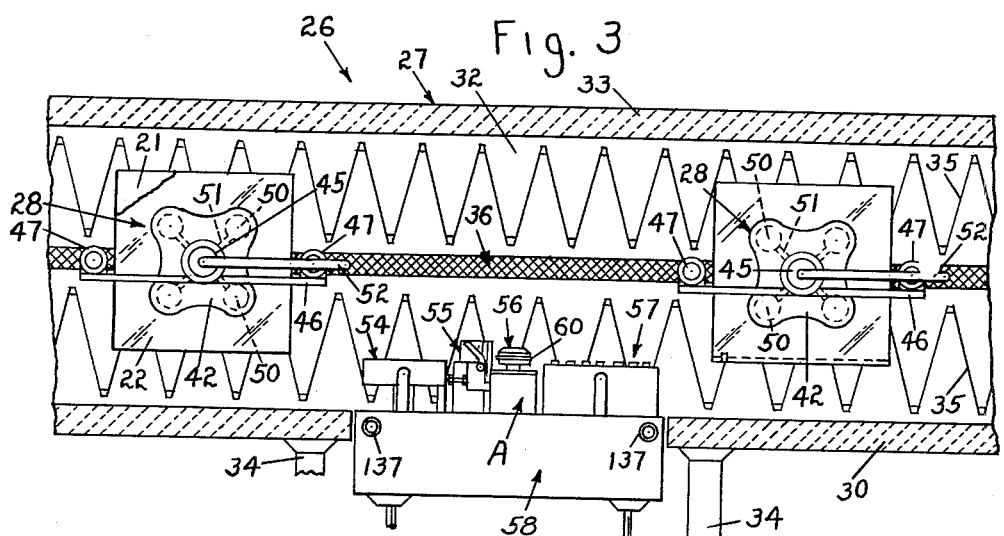
FIG. 3 is a fragmentary sectional view of the apparatus for producing all-glass glazing units taken along 3—3 of FIG. 2.

FIGS. 2 and 3 illustrate a preferred form of apparatus for producing the all-glass multiple sheet glazing unit of this invention which is designated generally by the number 26 and includes broadly a tunnel-type furnace 27, a supporting means 28 for maintaining glass sheets within the furnace in a vertical spaced relation and a conveyor 29 mounted outside the furnace and operatively connected to said sheet supporting means for moving the sheet supporting means and the glass sheets supported thereby through the furnace.

Examining the furnace 27 in greater detail, it comprises a lower wall 30, a pair of side walls 31 and 32, and a ceiling wall 33 all made of a suitable non-inflammable material such as firebrick. The lower wall 30 is supported by vertical support members 34 which are fixedly secured to the floor. The furnace 27 is shown, for purposes of illustration only, as heated electrically by wire filaments 35 fastened to the side walls 31 and 32 (FIG. 3). Although the heating means is illustrated as being electrical this is not meant to preclude the use of any other well-known heating techniques such as gas, for example. Additionally, in order to permit the sheet supporting means 28 to be moved by the conveyor 29 through the furnace, there is provided in the side wall 32 a slot 36 extending longitudinally with respect to the furnace.

Within the furnace 27 there are a plurality of sealing areas shown in FIG. 2 by the letter A through which the spaced glass sheets 21 and 22 are passed for sealing their edge portions together. On being moved through one of these sealing areas such as A the sheet supporting means 28 and the sheets 21 and 22 are supported and carried by the conveyor 29. The conveyor includes a carriage 37 adapted to ride on rails 38 mounted on a rail support frame (not shown). The carriage comprises a substantially rectangular base portion 39 provided with a plurality of grooved wheels 40 shaped to substantially the curvature of the rails 38 in order to guide the carriage during movement thereof. Axles 41 for receiving the wheels 40 are journaled on the underside of the carriage base (not shown).

The sheet supporting means 28 includes a pair of vacuum platens 42 and 43 for supporting the glass sheets in a substantially vertical, spaced, face-to-face position with respect to one another as the sheets are carried through the furnace and the sealing sections. More specifically, the vacuum platen 42 is maintained on one end of a stub shaft 44 which is mounted adjacent while the other end of the stub shaft is journaled in a bearing 45 on a cross arm 46. The cross arm in turn is supported by pillow blocks 47 secured to the conveyor 29 through the intermediary of horizontal support shafts 48. The other vacuum platen 43 is mounted on one end of a relatively long shaft 49 and is spaced from its companion platen 42 a distance equal to the desired width of an all-glass multiple sheet glazing unit to be produced. The shaft 49 is journaled in a bearing in the conveyor (not shown) and may be turned by a handle or other suitable actuating means (not shown) after a pair of opposed edges of the glass sheets have been fused together in order to present an unsealed pair of opposed edges into position for sealing.

As can be seen best in FIG. 3, each of the platens 42 and 43 is provided with a plurality of vacuum cups 50 for engaging a face surface of a glass sheet to hold it securely against the face of the platen. Grooves 51 are provided in the faces of the platens connecting each of the vacuum cups 50 to a central opening (not shown) provided in the stub shaft 44 and the long shaft 49 which openings are connected to a pipe means 52 connected to a suitable vacuum pump 53.

Turning now to the specific construction of the sealing station A, it comprises a fusing burner assembly 54, a dehydration opening forming device 55, an edge forming and shaping tool 56, and a reheating and polishing burner 57 all mounted on a supporting table 58 and all located within the furnace 27.

The first part of the sealing station A that a pair of glass sheets to be formed into a glazing unit meets is the fusing burner assembly 54. The fusing burner consists of two rows of gas fed nozzles 59 arranged along the path of movement of the glass sheets indicated by the arrow (FIG. 2) so as to direct flames onto the lower marginal edge portions of the glass sheets as they are conveyed therepast by the conveyor 29 in order to raise the temperature of these marginal edge portions above the softening point of the glass.

After the marginal edge portions of the glass sheets have been softened by the fusing burners 54 the sheets are then moved into contact with the forming tool 56 where the heated edges are moved toward and into fusion contact with one another. The forming tool 56 preferably consists of a pair of horizontally mounted rotatable shaping wheels 60 which may either be driven by frictional engagement with the glass edge portions moving therebetween or by a suitable drive means that will turn the shaping wheels at the same linear speed as the glass sheets moving through the sealing station. As illustrated in FIG. 7 each of the wheels 60 has a lower substantially cylindrical portion 61 of a uniform circumference while the upper portion of the wheel 60 is formed to provide a tapered portion 62. This tapered portion 62 of the wheels 60 engages the softened glass edges as they move therebetween and deflects these edges toward each other to a point where the edges become fused to one another forming the edge wall 23.

It will be noted in FIG. 7 that the lower cylindrical portion 61 of the wheels 60 is provided with a raised ridge 63. When a pair of such wheels are mounted in operative position the ridges 63 are opposite one another and serve to restrict the passage between the wheels somewhat for an important purpose that will be brought out later.

While the edges of the glass sheets are being formed together by the cooperative action of the forming wheels 60 it is the purpose of the present invention to place a hollow insert 64 between portions of heated marginal edges about to be fused and to maintain this insert in place until the heated glass edges immediately adjacent the insert are formed completely around the insert securing it firmly in a tightly sealed relationship within the newly formed edge wall 23. Thus, when placed in the edge wall the insert 64 establishes an access opening from the outside to the internal space 24 of the completed unit.

A preferred form of the insert 64 is that of a hollow cylinder which when positioned in the sealed edge wall 23 of a glazing unit has its central elongated opening extending from the space between the sheets to the exterior of the glazing unit so that its long dimension is disposed in a substantially parallel relation to the flat face surfaces of the glass sheets and substantially perpendicular to the sealed edge in which it is located (FIG. 11). However, it is considered within the contemplation of the invention that the insert may be of any of a number of possible shapes such as tapered, flanged at one or both ends, or having a cross section other than circular. Also it is considered that the insert may be placed in the edge wall at an angle other than perpendicular to the edge wall.

Further in this respect, although best results have been obtained with breather inserts of the above type constructed of nickel-iron alloys, it is considered possible that satisfactory inserts may be made of other metals, alloys or even ceramic materials, and still be within the contemplation of the invention.

Turning now to the detailed construction of the novel dehydration opening making device 55 (shown best in FIG. 5) this device comprises broadly a hollow insert feed supply 65 and insertion means 66. It is the function of the feed supply 65 to provide a continuous supply of inserts in position for being received by the insertion means 66 which performs the actual insertion of the inserts between the sheet edges for their incorporation into an edge wall.

The initiation of the operation of the dehydration opening making device 55 is under the control of switch 67 located outside the furnace and mounted adjacent rails 38. The switch is actuated by a cam 68 carried by the carriage 29 as it moves the glass sheets into the sealing station A. The electrical circuit associated with the control and operation of the dehydration opening device has not been described herein since it was not believed necessary for a clear presentation of the invention.

The insert feed supply 65 in its more detailed features (FIGS. 16 and 17) comprises a hollow base portion 69 supported by conventional vertical supports 70, within which base portion there is a vibration generating means (not shown) so adapted to vibrate substantially the flat upper surface 71 thereof. Mounted on this upper vibrating surface 71 is a circular metal mounting plate 72 having a hollow cylindrical metal chamber 73 secured thereto by a plurality of screw members 74 with its central cavity extending upwardly in a substantially vertical direction. The upper end of the cylindrical chamber 73 is adapted to receive a cylindrical open-ended container 75 thereon for containing a supply of metallic inserts 64 therein. The container 75 is provided along its inner wall surface with a continuous spiral groove or shelf 76 extending from the floor 77 of the container 75 to the upper end 78 thereof. The shelf is so dimensioned as to be able to accommodate a plurality of inserts 64 arranged in an end-to-end, chain-like relationship as illustrated in FIGS. 16 and 17. The upper end of the shelf is received into a tube 79 which leads outwardly from the container the function and coaction of which with respect to the other portions of the apparatus will be described in detail below.

In practice a plurality of the hollow metal inserts 64 are placed on the floor 77 of the container 75. A vibration generating means (not shown) is so adapted that on energization it causes the vibrating surface 71 in a well-known way to transfer vibratory energy along an arcuate path through the plate 72, cylinder 73 and the floor 77 of the container 75. When the floor of the container begins to vibrate in this manner the inserts 64 are caused to move along a similar curved path, to enter the spiral shelf and to be impelled along the path of the shelf upwardly. Thus, as is shown best in FIG. 17 a train or continuous line of the inserts is established along the spiral shelf 76 extending from the floor of the container up to, into and through the tube 79. When an insert is removed at any place along the chain or train of inserts another insert is immediately pushed into place so as to maintain a continuous unbroken line of inserts.

A vibratory insert feed supply of the type described above can be purchased from the Syntron Company of Homer City, Pennsylvania, under the manufacturer's designation of Model EBC-00.

The tube 79 (FIG. 16) is provided at a short distance from the container 75 with a pipe joint 80 which is connected to a curved pipe means 81 that leads downwardly to the insertion means 66 (FIGS. 4 and 5) and disposes an insert at the lower extremity 82 of the pipe 81 in position to be received by the insertion means 66 for insertion into an edge wall.

The insertion means 66 comprises broadly an insert transfer device 83 and reciprocal motion mechanism 84 (FIGS. 4 and 5). It is the function of the transfer device to take an insert from the lower end 82 of the tube 81 and remove it to a position where it can be carried by the reciprocating motion means 84 along the necessary path to accomplish the insertion of the insert in an edge wall.

Figure 8:
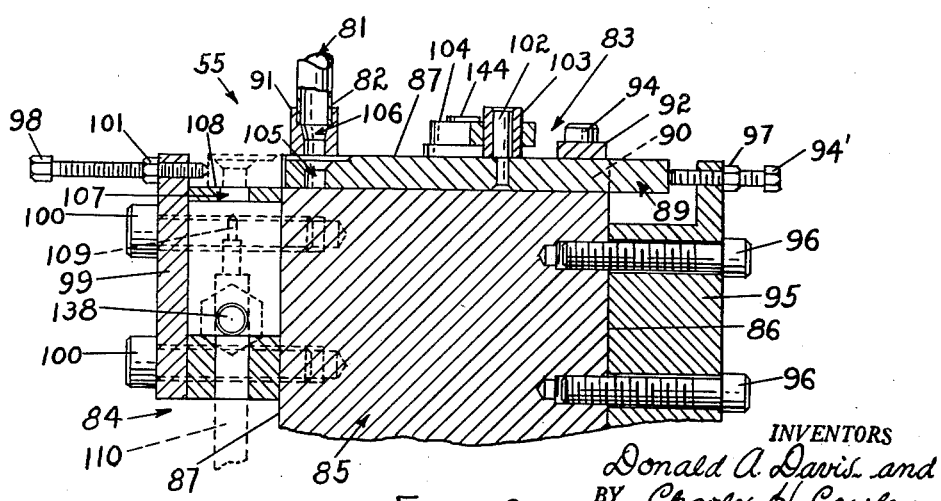
FIG. 8 is a cross-sectional, fragmentary, elevational view taken along 8—8 of FIG. 4.

The transfer device 83 as shown particularly in FIGS. 4, 5 and 8 comprises a base portion 85 having substantially vertical sides 86 and 87 and an upper substantially horizontal surface 88, and is disposed between the fusing burner assembly 54 and the shaping tool 56 and slightly to one side of the path along which the glass sheets pass. A rectangular transfer bar 89 slidably confined within a groove 90 in the upper surface 88 is confined to a given path of movement by a pair of guides 91 and 92 secured to the surface 88 by screws 94. The guides only permit the transfer bar to be moved in a direction substantially perpendicular to the path of movement of the sheets. This movement of the transfer bar is provided with one adjustable limit by a screw 94' threaded in a plate 95 secured to edge wall 86 of the base portion 85 by screw 96, which limit screw can be set in a prescribed fixed position by means of a nut 97. A second limit to the travel of the transfer bar 89 is provided by a second limit screw 98 threaded in a second mounting plate 99 secured to the side surface 87 of the body 85 in a spaced relation by screw means 100. This second limit screw can also be set in a fixed manner by a nut 101.

The transfer bar 89 is provided on its upper surface with an upright pin 102 having a sleeve bearing 103 thereon. The pin and bearing is received by a bifurcated arm 104 which provides movement to the transfer bar 89 in a direction substantially perpendicular to the path of movement to the glass sheets in a manner that will be set forth in detail below. This movement transfers the bar 89 loaded with an insert in opening 105 (FIG. 8) in a position where the insert is received by the reciprocal motion mechanism 84 and then moves the bar after loading of the insert back into position with the opening 105 underneath a second opening 106 in guide 92 into which the end 82 of the tube 81 is disposed.

When the limit screw 94' is properly adjusted the transfer bar 89 on reaching the righthandmost position as shown in FIG. 8 disposes the opening 105 directly below opening 106 so that an insert can be dropped into the opening 105 from the tube 81 under the influence of gravity. To insure correct alignment of the openings the limit screw 94 may be adjusted by loosening nut 97 and advancing or receding the screw as is necessary.

After an insert has been loaded into the opening 105, the transfer plate 89 is then moved in synchronism with the fusing of sheet edges to the position shown in phantom. The insert within the opening 105 drops through a guide opening 107 (FIG. 8) in a guide plate 108 secured to base 85 and plate 99 where it is received or loaded onto a loading reciprocating motion means 84 for actual placement in an edge wall of a glazing unit.

The projection 109 carrying an insert is provided with a motion by the reciprocal motion mechanism 84 that carries the insert up into position between a pair of glass sheets permitting it to be fused in place by the forming tool, and then lowers and removes the unloaded projection from the fusing area back into position for reloading with another insert.

Referring specifically to FIG. 5 the projection 109 is shown disposed at the upper end of a vertical support 110 pivotally mounted at an end of an upper support bar 111 and also at an end of a lower support bar 112 both of which have their other ends pivotally mounted in the same plane as the bar 110 in a support wall 113. The arrangement of the support 110, bars 111 and 112, and the wall 113 forms a parallelogram. With a mounting of this kind the projection 109 and the bar 110 on moving upwardly or downwardly are maintained in a constant vertical position. Thus, the support 110 will be kept in parallelism with the wall 113 which is kept in a vertical position. This vertical position of the projection 109 is important because if too great a departure from the vertical were permitted an insert carried thereby might be dropped off or knocked off the projection 109 during the insertion process.

The support wall 113 is fixedly mounted on a pair of horizontal guide rods 114 and 115 which rods are slidingly received in openings in a pair of support plates 116, 117 disposed one on each side of the wall 113 which plates are secured to a base plate 118. This mounting arrangement permits the support wall 113 to be moved in a direction toward and away from the forming tool 56 in a plane substantially parallel with the lower edge of the sheets of glass. The plates 116, 117 are provided with limit screws 119 and 120 (FIG. 5), respectively, to limit the rearward and forward travel of the vertical support wall 113 and consequently the horizontal position of the insert. These limit screws can be adjusted and held securely in place by their respective stop nuts 121 and 122.

The vertical support plate 113, and the vertical support rod 110 carrying the projection 109 and insert, are provided with its motivating power by a hydraulic cylinder 123 acting on a piston (not shown) and shaft 124 with the latter secured to the support plate 113. The cylinder is mounted in a fixed position on base plate 118 by bracket 125 and screw means 126. As can be seen best in FIG. 5 application of hydraulic pressure to the cylinder 123 actuates the piston and shaft 124 which causes the wall 113, support members 111 and 112, vertical support 110 and the projection 109 to move along the prescribed path of movement.

In addition to the forward and backward motion discussed in the preceding paragraph it is also necessary that the insert be moved up into position between the sheet edges during its incorporation into the edge wall and then the unloaded projection be moved downwardly and away from the fused edge wall afterward. The mechanism for producing this vertical motion in a timed sequential manner comprises a fixed guide bar 127 (FIGS. 5 and 6), a pivotal guide bar 128, and inclined guide block 129 and a positioning pin 130, all of which coact with one another as will now be set forth in detail.

Figure 6:
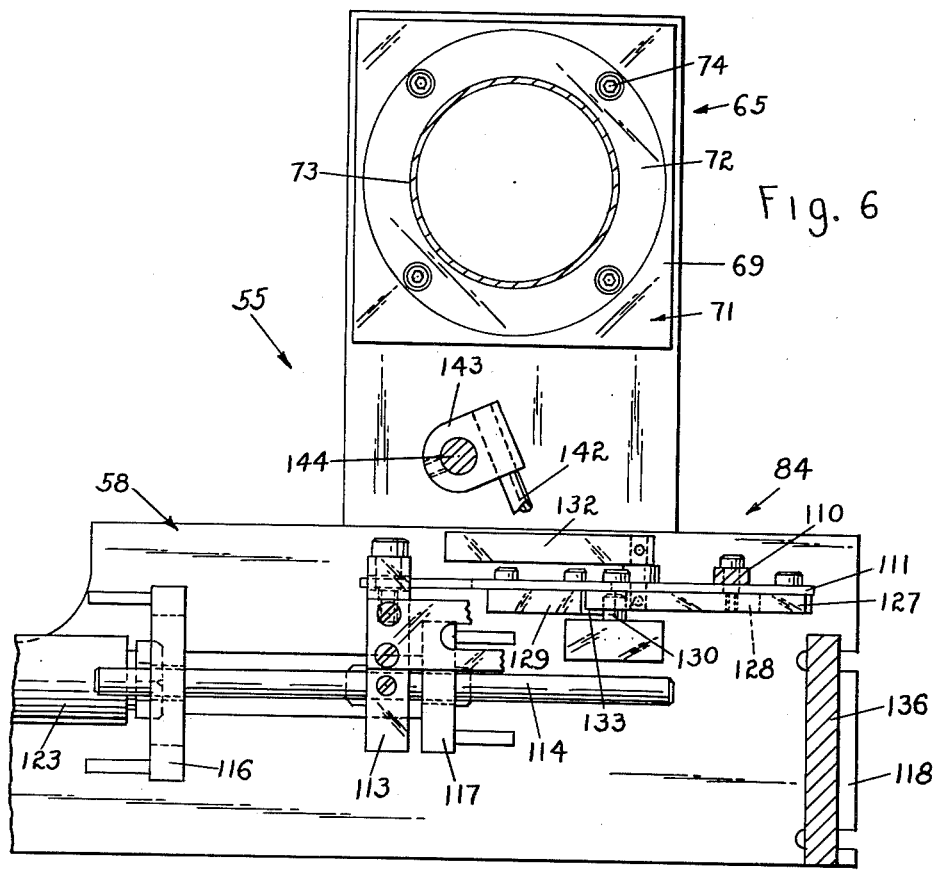
FIG. 6 is a fragmentary sectional view taken along 6—6 of FIG. 5.

The guide bar 127 consists of a substantially rectangular member fixedly mounted on a side of the upper support member 111 having a lower planar surface disposed to an inclined position when the projection 109 is in its upwardmost position as is shown best in FIG. 5. The pivotal guide bar 128 consists of an elongated member rotatably mounted from one end by a pivot pin 131 carried by the lower support member 112. The other end of the bar 128 is maintained in a contacting relationship with the lower surface of the guide bar 124 through the action of a counterweight 132 affixed to pivot pin 131 (FIG. 6). Also carried by the lower support member 112 rearwardly of the pivotal guide bar 128 is the inclined guide block 129 having an angular surface 133 facing the pivot pin 131 and spaced therefrom. The positioning pin 130 has one end fixed in a block 134 which is in turn mounted on base plate 128. The pin 130 extends substantially horizontally a sufficient distance so the periphery of its outer extremity can engage the angular surface 133 and the lower surface of the fixed guide bar 127.

As is illustrated best in FIG. 5 the reciprocal motion means 84 is separated from the furnace 27 by a horizontal plate 135 mounted on the base plate 118 by supports 136. It is the plate 135, supports 136 and base plate 118 that collectively comprise the supporting table 58. This shielding of the moving parts of the reciprocal motion means 84 from the furnace is important since the high heat of the furnace by fatiguing the metal and/or oxidizing the metal surfaces would cause the different parts to malfunction or be quickly damaged and have to be frequently replaced. In fact it has been found advisable to provide the plate 135 with coils 137 disposed in contacting relation therewith for circulating a cooling medium (not shown) to reduce the surrounding temperature even further in order to obtain a relatively troublefree operation.

As to the detailed operation of reciprocating motion means 84 which will be given at this time reference should be made to both the appropriate diagrammatic of FIGS. 12 to 15 for the relative positions of the parts of the apparatus to one another, and also to FIG. 5 for the more specific construction of the apparatus.

In FIG. 12 the stage of the operational cycle is shown where the projection 109 carrying an insert is approximately at its maximum forward and upward position with the insert having already been placed into position in a fused edge wall. It is to be noted that the positioning pin 130 is in contact with the inclined face 133 of the block 129 and is just barely engaging the rearwardmost part of the pivotal guide bar 128. A slight further forward motion of the vertical wall 113 and the support members 111, 112 causes the pivotal bar 128 to disengage the positioning pin 130 so that the support members drop to a lower position moving the projection 109 downwardly away from the forming rolls to a position as shown in FIG. 13. At this point the fixed guide bar 127 has its lower surface resting on the positioning pin 130. By control apparatus (not shown) the hydraulic cylinder at this time reverses its movement causing the vertical support wall 113, attached support members 111, 112 and the vertical support 119 carrying the projection 109 to move rearwardly away from the forming rolls.

As the rearward limit of travel is approached, the positioning pin 130 first engages the pivotal bar 128 moving it away from contact with the lower surface of the fixed guide bar 127 and then disengages the pivotal bar allowing it to return to a contacting relationship with the fixed guide bar through the action of counterweight 132 (FIG. 6). At the limit of rearward motion the positioning pin assumes the position illustrated in FIG. 14 with the projection directly below the opening 107 in the block 108. The projection 109 remains in this position until it has been loaded and the forward motion is instituted to begin a loading cycle.

As was described above the rearward limit to the movement of the projection 109 is controlled by the position of limit screw 119. It has been found, however, that because of "play" in the system and the required accuracy of the rearwardmost positioning in order to load an insert on the projection 109, it is advisable to provide another limit screw 138 disposed in a plate fixed to the mounting plate 99 and base 85 (FIGS. 4 and 5). This limit screw engages the vertical support 110 and determines the precise limit of its rearward motion.

On the cycle being initiated by actuation of the switch 67 by cam 68 (FIGS. 2 and 14) the projection carrying an insert moves forward toward the forming tool and also rises upwardly as it approaches the forming tool so as to move the insert between the edges of the glass sheets which are to be fused to one another. This upward motion is accomplished by maintaining an engagement of the positioning pin 130 with the inclined lower surface of the pivotal bar 128 during the forward motion. Just prior to moving between the forming wheels 60 the insert stops its upward travel while maintaining its forward travel. This is a substantially horizontal movement which is accomplished by the pivotal guide bar 128 and riding on a dwell or substantially horizontal portion of the guide bar (FIG. 15). Further forward movement brings the projection and the insert carried thereby into position where the forming wheels urge the heated glass edges toward one another around the insert incorporating it into the fused edge wall in a continuous manner, or in other words back to a position as shown in FIG. 12.

By means (not shown) the forward movement of the projection carrying the insert is synchronized so as to move at substantially the same linear speed as the glass edges being fused into an edge wall. This is important in that any substantial difference in speeds between the two produces a wrenching or twisting of the insert in the edge wall which can produce an imperfect seal around the insert permitting moisture to gain access to the interior and necessitating rejecting the unit.

Referring now specifically to FIG. 7 it is to be noted that as the insert is being fused into the edge wall the opposed ridges 63 on the cylindrical portions 61 of the forming wheels 60 are disposed under the insert in this way preventing the insert from being partially or completely removed from the edge wall on withdrawing the projection 109 from operative engagement with the insert. This feature is an important one since, as commented on above, a disturbance of the insert at this time while it is in the still pliable edge wall can produce an imperfect seal with deleterious results.

It is to be emphasized that the withdrawal of the projection 109 from engagement with the insert during the fusing operation must be performed substantially instantaneously along a path perpendicular to the sealed edge wall to prevent disturbing the insert seated in the plastic glass. Thus, if a substantial deviation of the projection from the vertical position is permitted or the withdrawal is performed at a relatively slow rate the projection will drag against the inside of the insert producing a twisting or turning of the insert in the pliable edge wall which is undesirable for the reasons given above. This motion is accomplished when the rearwardmost portion of the pivotal guide bar 128 drops off the positioning pin 130 and the lower surface of the fixed guide bar 127 is brought into engagement with the positioning pin (see FIGS. 12 and 13).

The operation of the reciprocal motion means and the feeding of a new insert onto the projection 109 is accomplished in a synchronized manner. Thus, referring to FIGS. 4 and 5 it is to be noted that the vertical wall 113 is provided at its upper portion with a substantially horizontal mounting plate 139 which plate is provided with an upwardly extending screw 140 having a roller 141 on its extremity for rotation in a horizontal plane. During the rearward movement of the vertical support 110 carrying the projection to a loading position as shown in FIG. 14 the roller 141 engages a substantially horizontal rod 142. One extremity of the rod 142 is fixedly received in a collar 143 which is pinned to an upwardly extending shaft 144. The upper end of the shaft (FIG. 4) is received in an opening in the bifurcated arm 104 and pinned thereto.

The synchronism of the loading operation with the motion of the projection 109 can be understood best by referring to FIGS. 4 and 8. As the projection and the plate 113 begin rearward motion the roller 141 engages the rod 142 causing it to rotate in a clockwise direction as seen in FIG. 4, which rotation causes the bifurcated arm 104 to move the transfer bar 89 containing an insert in the opening 105 to a position such that when the projection is at its rearwardmost limit of travel and disposed immediately under the opening 107 in the plate 108 the transfer bar 89 has moved sufficiently to locate the opening 105 over the opening 107 and the insert loaded therein will drop through the opening 107 and be received on the projection. When the forward motion of the projection is begun the rod 142 is rotated in a counterclockwise direction through the action of a spring 145 connected to eyelet means 146 in the extremity of the rod and to a fastening means 147 (FIG. 4) secured in the plate 135. This counterclockwise motion returns the transfer bar 89 to a position where the opening 105 is disposed under the opening 106 in the guide 92 to receive an insert for a subsequent loading operation.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. Apparatus for placing a hollow insert in an edge wall of an all-glass multiple sheet glazing unit in order to provide an access opening to an enclosed space therein, said glazing unit being produced by moving a pair of spaced glass sheets along a definite horizontal path past heat sources for raising the temperature of the marginal edge portions thereof and subsequently past forming means for urging the edge portions into fusion contact with each other to provide a sealed edge wall, said apparatus comprising an insert supply means adjacent said path in advance of said forming means, a vertically maintained support movable along said path between a first position adjacent said supply means and a second position adjacent said forming means and laterally of said path toward and away from said glass sheets, said support having its upper extremities adapted to receive a hollow insert thereon, a reciprocal motion mechanism operable to move said support upwardly adjacent said first position, thereby to bring said insert into position between the marginal edges of the glass sheets and then horizontally along said path to maintain the insert in a fixed position relative to the glass sheets to said second position adjacent said forming means, thereafter to move downwardly away from said marginal edges and backwardly to said first position, said mechanism comprising a frame, a vertical wall member guided on said frame for movement back and forth along a horizontal path parallel to said definite path, an upper support bar pivoted at one end to said wall and at the other end to said vertical support, a lower support bar disposed parallel to and below said upper bar and pivotally connected at its opposite ends to said wall and said vertical support, a first guide bar fixed to said upper support bar, a second guide bar pivoted on said lower support bar, cam surfaces formed on said first and second guide bars, a positioning pin fixed to said frame and coacting with said cam surfaces to raise and lower said vertical support as said wall moves back and forth along said path relative to said positioning pin, and actuator means sliding said wall along said path in timed relationship to the movement of said glass sheets.

2. Apparatus for placing a hollow insert in an edge wall of an all-glass multiple sheet glazing unit as defined in claim 1, in which the movements of said vertical support are guided by said positioning pin riding along a first cam surface formed on the lower edge of said second guide bar as said support moves forwardly along said path, and by said positioning pin riding along a second cam surface formed on the lower edge of said first guide bar as said support moves backwardly along said path, said second guide bar having its free end urged toward said first guide bar whereby said first and second cam surfaces are normally continuous but being operable to swing away from said first guide bar as said positioning pin rides along said second cam surface during movement of said support element backwardly along said definite path to said first position.

3. Apparatus for placing a hollow insert in an edge wall of an all-glass multiple sheet glazing unit as defined in claim 2, in which said first cam surface includes a portion inclined downwardly from said second cam surface, whereby to guide said support element for movement upwardly adjacent said first position as said wall is moved forwardly along said path and a normally horizontal portion coacting with said positioning pin to maintain said support in said raised position as the latter moves forwardly into said second position, said horizontal portion being spaced below said second cam surface and terminating adjacent the pivoted end of said pivoted guide bar, whereby upon forward movement of said wall relative to said positioning pin the latter rides off of said horizontal portion permitting the mechanism to drop downwardly, bringing said second cam portion into surface engagement with said positioning pin.

References Cited in the file of this patent

UNITED STATES PATENTS

| | | |
|---|---|---|
| 1,448,351 | Kirlin | Mar. 12, 1923 |
| 2,301,940 | Fries | Nov. 17, 1942 |
| 2,624,978 | Hohmann | Jan. 13, 1953 |
| 2,761,248 | Cowley et al. | Sept. 4, 1956 |
| 2,761,249 | Olson et al. | Sept. 4, 1956 |
| 2,819,816 | Moeltzner et al. | Jan. 14, 1958 |
| 2,870,938 | Sirles et al. | Jan. 27, 1959 |